United States Patent Office 2,984,575
Patented May 16, 1961

2,984,575
GOLD TERTIARY MERCAPTIDES AND METHOD FOR THE PREPARATION THEREOF

Howard M. Fitch, Millburn, N.J., assignor, by mesne assignments, to Engelhard Industries, Inc., Newark, N.J., a corporation of Delaware No Drawing. Filed Apr. 9, 1958, Ser. No. 727,254

35 Claims. (Cl. 106—1)

This invention relates to novel gold tertiary mercaptides which possess unusual properties and are useful in gold decorating compositions.

There is a fairly extensive literature on gold alkyl mercaptides containing polar groups, the purpose of the polar group being to render the mercaptide water soluble so that it can be used for therapeutic purposes, such as in the treatment of arthritis. These water soluble compounds are inherently unsuitable for use in gold decorating compounds and no such use of these compounds is known.

Gold cyclic terpene mercaptides, and their use in gold decorating compositions, have been disclosed heretofore (U.S. Patent No. 2,490,399). Compounds disclosed therein include gold mercaptides of alpha-pinene mercaptan, beta-pinene mercaptan, dipentene mercaptan, terpinolene mercaptan, menthene mercaptan, alpha-terpineol mercaptan and camphene mercaptan. These mercaptans are prepared by hydrogenating a sulfurized cyclic terpene compound in the presence of a sulfactive hydrogenation catalyst, as described in U.S. Patent No. 2,402,-698. Mercaptans can also be prepared by the catalytic addition of hydrogen sulfide to cyclic terpenes (U.S. Patent No. 2,076,875). The structures of the cyclic terpene mercaptans prepared by either process have never been elucidated, and the location of the mercaptan group in the molecule is not known. The gold cyclic terpene mercaptides are alleged to have the advantages of high yields, high solubilities, good stability and a light color, as compared to gold compounds previously used in gold decorating compositions. The gold mercaptide of thioborneol has also been disclosed (A. Nakasuchi, J. Soc. Chem. Ind., Jap. 38, Suppl. 617B (1935)). Thioborneol is a bicyclic secondary mercaptan of known structure.

In accordance with the present invention, it has been found that tertiary alkyl mercaptans react with gold salts to form gold tertiary alkyl mercaptides which possess unusual properties, and are useful in gold decorating compositions. The tertiary alkyl mercaptans are mercaptans in which three alkyl groups are attached to the carbon atom adjacent to the mercaptan sulfur atom. These mercaptans contain at least four carbon atoms, and have the following general formula:

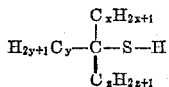

in which $x$, $y$ and $z$ are integers from 1 to about 40. The mercaptans react with gold salts to form aurous mercaptides of the formula:

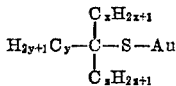

in which $x$, $y$ and $z$ are as given above.

These aurous mercaptides will be referred to as gold tertiary alkyl mercaptides, since auric mercaptides are not known and the same aurous mercaptide is obtained from auric salts and from aurous salts.

The gold tertiary alkyl mercaptides of the invention may be prepared by admixing a tertiary alkyl mercaptan with a gold salt, such as auric bromide, auric iodide, potassium bromaurate and potassium iodourate. Auric chloride or potassium chloraurate are preferred, however, since they are stable and easy to prepare. Auric chloride is prepared by dissolving metallic gold in aqua regia and decomposing the nitric acid present by repeated evaporations with hydrochloric acid. Removal of the excess hydrochloric acid is not necessary, and the resulting solution of auric chloride in hydrochloric acid, known as gold liquor, is suitable for use in preparing gold tertiary alkyl mercaptides. The gold liquor may be diluted with water before use, or solvents such as ethyl acetate or methanol may be used. Preferably, from three to four moles of mercaptan to one mole of auric chloride are used, and higher ratios may be employed, but without substantial advantage. The reaction temperature is not critical, and may vary from 0° C. to about 100° C. Usually, it is preferable to mix the mercaptan and gold salt in a suitable solvent at a temperature in the range of about 20 to 50° C. and to complete the reaction by heating to temperatures in the range of about 60 to 80° C. Temperatures in excess of 100° C. should be avoided due to the relatively low temperatures at which these mercaptides are converted to metallic gold.

The reaction is somewhat exothermic, and it is usually preferable to add one reactant to the other slowly or in increments with cooling if required. The reaction product is obtained as an oil or an oily solid containing any excess mercaptan and large amounts of bis-tertiary alkyl disulfides formed in the reaction. The product is purified by washing or leaching with methanol, or with mixtures of methanol with acetone, isopropanol or benzene. Some of the less soluble gold tertiary mercaptides may be further purified by crystallization from a suitable solvent, such as toluene.

In this method of preparation, bis-tertiary alkyl disulfides are formed according to the following equation, where R is a tert.-alkyl group:

Thus, for every mole of mercaptan combined as gold mercaptide, two moles of mercaptan form the disulfide. This is advantageous, particularly when the more expensive mercaptans are used and with mercaptans forming the more soluble gold mercaptides, since substantial amounts of gold mercaptide are lost in separating the disulfide. It would, therefore, be advantageous to employ an aurous salt, such as aurous chloride, in the reaction in order to eliminate disulfide formation. Aurous salts are notoriously difficult to make, however, and are of poor stability, and they tend to be contaminated with greater or lesser amounts of metallic gold. Some success has been claimed for the use of aurous cyanide in various reactions, but the use thereof is complicated by the toxic nature of the hydrogen cyanide produced as a by-product. Lower alkyl sulfides are known to react with auric halides to give lower alkyl sulfide-aurous halide complexes according to the following equation, in which R is a lower alkyl group and X is halogen:

In accordance with the present invention, it has been found that the lower alkyl sulfide-aurous halide complexes react with tertiary alkyl mercaptans to give gold tertiary mercaptides according to the following equation, in which R is a lower alkyl group, R¹ is a tertiary alkyl group and X is halogen:

$$R_2S \cdot AuX + R^1SH \rightarrow R^1SAu + R_2S + HX$$

The reaction proceeds smoothly at ordinary temperatures to give high yields of gold tertiary alkyl mercaptides that are uncontaminated with disulfides or with metallic gold. Use of the methyl sulfide-aurous chloride complex is preferred, since auric chloride and methyl sulfide are readily available as starting materials, and since methyl sulfide and methylsulfoxide are sufficiently soluble in water to be readily removed from the product by water washing. Preferably, methyl sulfide and gold liquor are mixed in an aqueous medium at temperatures between 0 and 38° C. and, without isolating the reaction product, the tertiary alkyl mercaptan is added promptly. The lower alkyl sulfide-aurous halide complexes tend to decompose upon exposure to air and upon attempted isolation or purification, with the formation of metallic gold. This decomposition is avoided by using excess lower alkyl sulfide and by not isolating the lower alkyl sulfide-aurous halide complex. An excess of about 1 mole is sufficient to prevent decomposition, and it is preferred to use a total of about 3 moles of lower alkyl sulfide per mole of auric halide. Higher ratios may be used, but without substantial advantage. Temperatures in excess of 38° C. should be avoided due to the volatility of the lower alkyl sulfides and the instability of the complex. The reaction between the lower alkyl sulfide and the auric halide is somewhat exothermic, and cooling of the reaction mixture usually will be required. The reaction of the complex with the tertiary alkyl mercaptan is only very mildly exothermic, and little cooling is required for this reaction. Other solvents such as methanol may be used, but it is apparent from the above equations that at least one mole of water is required in the reaction. When the gold salt is in the form of gold liquor, sufficient water usually will be available, but when anhydrous gold salts are used in solvents other than water, at least one mole of water per mole of gold salt should be present in the reaction mixture.

A particularly advantageous method comprises slowly adding a solution of auric halide, such as gold liquor diluted with water, to a mixture of tertiary alkyl mercaptan and a lower alkyl sulfide. A solvent, such as chloroform or toluene, may be employed in the reaction mixture, if desired, to maintain the gold tertiary mercaptide in solution. When the reaction is accomplished in this manner, the auric halide first reacts with the lower alkyl sulfide to give a lower alkyl sulfide-aurous halide complex, and the complex reacts almost immediately with the tertiary alkyl mercaptan to form a gold tertiary alkyl mercaptide. This results in very high yields of a clean and light colored product. As shown by the foregoing equations, lower alkyl sulfide is released when the complex reacts with the mercaptan and becomes available for further reaction with the auric halide. This allows a substantial reduction of the amount of lower alkyl sulfide required. Generally speaking, quantities of from 1.7 to 2.0 moles of lower alkyl sulfide and from 1.0 to 1.1 moles of tertiary alkyl mercaptan per mole of auric halide are optimal when the reaction is accomplished in this manner. Temperatures in the range of 0 to 25° C. usually will be preferred, but higher temperatures may be used, taking into account the boiling point of the alkyl sulfide and the decomposition point of the gold tertiary alkyl mercaptide, since there is little opportunity for the lower alkyl sulfide-aurous halide complex to decompose. The auric halide solution should be added at such a rate, depending on temperature and dilution, that there is no substantial accumulation of the intermediate lower alkyl sulfide-aurous halide complex.

The gold decorating compositions in which the gold tertiary alkyl mercaptides of the invention may be used are compositions which form a film of metallic gold when applied to various surfaces and heated. Gold decorating compositions for glass and ceramics are known to the art and have been described by Boudnikoff, Comp. rend. 196, 1898 (1933), and by Chemnitius, J. Prakt. Chem. 117, 245 (1927).

Such compositions contain a gold resinate prepared by reacting a gold salt with a sulfurized terpene such as sulfurized Venetian turpentine. The gold resinate is dissolved in solvents such as oils of lavender, rosemary, aniseseed, sassafras, wintergreen and fennel, turpentine, various terpenes, nitrobenzene, amyl acetate, and the like, and is mixed with gold fluxes such as salts and resinates of rhodium, chromium, bismuth, lead, cadmium, tin, copper, cobalt, antimony and uranium, Assyrian asphalt and various rosins to form a gold decorating composition. More recently, it has been proposed in U.S. Patent No. 2,490,399, to use a gold cyclic terpene mercaptide in place of the gold resinate in such compositions.

The gold tertiary alkyl mercaptides of the present invention have the advantages of light color, high yields and high stability to storage disclosed for the gold cyclic terpene mercaptides, and many of them have an even wider range of solubility in organic solvents. In addition, the gold tertiary alkyl mercaptides have the distinct and unexpected advantage of requiring lower firing temperatures to develop a film of metallic gold than are required by compositions known heretofore.

While the decorative effect is an outstanding property of the film of metallic gold produced from gold decorating compositions, these films inherently possess other useful properties such as a high degree of reflectivity to light, and particularly to infrared radiation, making them useful on reflectors for lamps, ovens and the like; electrical conductivity, making them useful in forming printed circuits and resistors and as bases for soldering connections to non-conductive materials, for electroplating and for plating by dipping in molten metals and alloys; and chemical inertness, making them useful for protecting the underlying surface from corrosion, oxidation and the like. In speaking of decoration and decorating compositions, it is intended to include the other useful properties inherent in the gold films produced.

Solubility in organic solvents and particularly in non-polar solvents is desirable for gold compounds which are to be used in gold decorating compositions. In a homologous series, solubility in non-polar solvents usually increases with increasing length of the carbon chain. The effect of chain branching is not great and may even adversely affect solubility to the extent that, for a given number of carbon atoms, a shorter chain will be present. The gold tertiary alkyl mercaptides have a truly inordinate solubility in non-polar solvents compared to the analogous gold primary alkyl mercaptides. As an example of this, gold n-dodecyl mercaptide is soluble only to the extent of about 0.0035 percent by weight in toluene at room temperature, to give a solution containing only about 0.0017 percent by weight of gold. In contrast, gold tert.-dodecyl mercaptide is miscible in all proportions with toluene, and fluid solutions in toluene containing 30 percent or more by weight of gold are obtained at room temperature. Similar solubility ratios between gold primary and tertiary alkyl mercaptides are obtained with other gold tertiary alkyl mercaptides and in other non-polar solvents.

Pure tertiary alkyl mercaptans are not essential to the practice of this invention, and mixtures of tertiary alkyl mercaptans are suitable starting materials for the preparation of gold tertiary alkyl mercaptides. Such mixtures may be obtained by the catalytic addition of hydrogen sulfide to various olefins and olefin polymers derived from petroleum refining operations as described by Schulze, Lyon and Short, Ind. Eng. Chem. 40, 2308 (1948). Such mixtures, while they may be fractionated to give an average molecular weight corresponding to a particular tertiary alkyl mercaptan, will contain components having a smaller or larger number of carbon atoms in the molecule and having a wide variety of molecular structures which cannot be separated by the usual methods of fractional distillation. The components are tertiary alkyl mercaptans, however, and the mixtures are suitable for preparing gold tertiary alkyl mercaptides.

The gold tertiary alkyl mercaptides of the invention are not all equivalent to each other in every respect. Generally speaking, gold tertiary alkyl mercaptides containing four to eight carbon atoms, while enormously more soluble than their primary analogues, are not sufficiently soluble in non-polar solvents to be employed in liquid bright gold decorating compositions. They are suitable for use in burnish gold decorating compositions, such as those described in U.S. Patent No. 2,383,704, and they have certain advantages for such use. These burnish gold compositions, which are also called powder golds or paste golds, depending upon the method of their application, are composed of metallic gold in powdered form, a solid diluent such as mercuric oxide or sulfur, and a gold flux. They may be applied, without further compounding, by dusting; or they may be incorporated into organic vehicles to produce pastes or suspensions for application by printing, stamping or brushing. The metallic gold film obtained on firing the burnish gold decorating compositions is dull in appearance and must be burnished to bring up the true color of the gold. Of course, the reverse side of the gold film cannot be burnished, and when burnished golds are used on a transparent surface, such as glassware, the inner surface thereof has an unattractive appearance. The gold tertiary alkyl mercaptides containing four to eight carbon atoms may be used to replace all or part of the metallic gold powder previously employed in such burnish gold compositions. The burnish golds obtained in this manner give a brighter gold film than those previously employed, require less burnishing, and have a better appearance on the reverse side of the film. In addition, they require lower firing temperatures to produce the gold film.

Gold tertiary alkyl mercaptides containing nine or more carbon atoms may be employed in liquid bright gold decorating compositions, and gold tertiary alkyl mercaptides containing twelve or more carbon atoms are sufficiently soluble to be employed in all known liquid bright gold decorating compositions. Liquid bright gold decorating compositions have a much greater range of application and utility than burnish gold, and it is preferred to use the gold tertiary alkyl mercaptides containing nine or more carbon atoms, and particularly those containing twelve or more carbon atoms. The gold tertiary dodecyl mercaptides have a very high solubility in organic solvents and, due to their higher gold content, will usually be preferred to the gold tertiary alkyl mercaptides containing more than 12 carbon atoms. It is preferred to use the gold tert.-dodecyl mercaptides obtained from the tert.-dodecyl mercaptans prepared by a low temperature catalytic addition of hydrogen sulfide to triisobutylene, as described in U.S. Patent Nos. 2,481,583 and 2,531,602. The product of this reaction is believed to consist principally of a mixture of 2-neopentyl-4,4-dimethyl-2-pentanethiol and 1,1,3,3,5,5-hexamethylhexanethiol in the ratio of about nine parts of the former to one part of the latter, and reacts with gold salts to give the corresponding gold mercaptides. This mixture of gold mercaptides, when compounded with a gold flux in a solvent and fired on a glass or ceramic surface, gives a mirror-bright gold film with a pure gold yellow color and an exceptional brilliance.

Previously known gold compounds useful in gold decorating compositions require relatively high temperatures to form a film of metallic gold, limiting their application to the decoration of relatively refractory materials such as glass, ceramics, metals, quartz, carbon, mica, and other materials that are not damaged by the high temperatures required. An outstanding advantage of the gold tertiary alkyl mercaptides of the invention is the relatively low temperature required to form a film of metallic gold therefrom, extending their application to a wide range of plastics, plastic laminates, wood, paper, textiles, leather and similar materials that would be damaged by high temperatures. As an example of this difference, a solution of gold tert.-dodecyl mercaptides in a mixture of turpentine and toluene was brushed on glass slides, the solvent was evaporated, and the slides were heated for one hour in an oven at various temperatures. At temperatures of 160° C. and above, a specular film of metallic gold was formed that was a good conductor of electricity and was bright on both its upper and lower surfaces.

Under the same conditions, gold pinene mercaptide, prepared as described in Example I of U.S. Patent No. 2,490,399, does not produce a film of metallic gold at 160° C. or 180° C. Some gold was deposited at a temperature of 200° C., but the lower surface was black, with no appearance of metallic gold, and the film was substantially a non-conductor of electricity, indicating that a continuous film of metallic gold was not formed. Still higher temperatures are required to obtain a specular conductive film of metallic gold from gold pinene mercaptide, or from gold resinates. The ability to form a film of metallic gold at relatively low temperatures is a distinct advantage even in applications on relatively refractory materials where it may be desirable to heat the material to the point of incipient softening, which may vary from about 500° C. for a soft glass, to about 800° C. for a porcelain, and even higher for very refractory materials such as Pyroceram and quartz to improve the adherence of the gold film. The initial formation of the gold film should take place in an oxidizing atmosphere in order to promptly and completely remove organic matter from the film. This oxidizing atmosphere is usually provided by good ventilation of the oven or kiln in which the gold film is produced, and such ventilation becomes increasingly difficult and costly with increases in temperature, since heat is lost to the air introduced by ventilation.

In addition to a gold compound capable of producing a film of metallic gold when heated, gold decorating compositions usually include a diluent therefor and a gold flux. The choice of diluent controls the behavior of the composition before firing, and is dictated by the method by which the composition is to be applied. The diluent may be a simple solvent, but it will usually include mixtures of essential oils, terpenes, resins, and the like, carefully chosen to impart specific physical properties to the composition. These properties, such as oiliness, viscosity, evaporation rate, surface tension and tack, will vary for different methods of application, such as brushing, spraying, stippling, stamping, printing, both direct and offset, hot or cold screen printing, stenciling, decalcomania, and the like. The requisite properties and the diluents required to produce them are well known to those skilled in the art of making inks, paints and lacquers. It is an advantage of the more soluble gold tertiary alkyl mercaptides of the invention that they are highly soluble in a wide range of organic solvents. This permits a very wide latitude in the choice of diluents and permits the use of desirable ingredients such as lacquers, synthetic resins, and the like, that are not commonly incorporated into gold decorating compositions.

The choice of ingredients for the gold flux determines the behavior of the gold film during and after firing, and is usually dictated by the composition of the article to be decorated and the use for which it is intended. The gold flux will usually contain small amounts of salts or resinates of rhodium or iridium to improve the continuity and brilliance of the gold film. Other ingredients, such as salts and resinates of bismuth, chromium, lead, cadmium, tin, copper, cobalt, antimony and uranium are employed to improve the adherence of the gold film and its resistance to abrasion and corrosive chemicals. These ingredients fuse to a low melting glass or glaze and are well understood by those skilled in the art of compounding glazes and porcelain enamels. Other ingredients may be added to alter the color of the gold film. Silver salts and resinates, for example, give a green gold, and palladium or platinum salts and resinates give a white gold. The conventional glazes cannot be used to promote adherence of the gold film to non-refractory materials such as plastics, wood, paper and the like, and the gold film on such material usually will be protected by a coating of lacquer or varnish, or by laminating a thin film of plastic to the surface. A lacquer may also be incorporated as a diluent in the gold decorating composition to provide an adherent film.

In addition to their use in burnish gold compositions, which may contain from about 20 to 60 percent or more of gold, and in liquid bright gold compositions, which may contain from about 5 to 40 percent or more of gold, the gold tertiary alkyl mercaptides of the invention are suitable for use in gold lusters. These lusters resemble liquid bright gold in composition, but contain relatively less gold and more gold flux. Instead of firing to a conductive film of bright gold, the gold luster compositions give non-conductive films of various colors, depending upon the amount of gold present and the nature of the gold flux, having a characteristic metallic gold sheen or luster. The colors produced are believed to result from the presence in the film of colloidal metallic gold in various particle sizes.

The gold tertiary alkyl mercaptides that are obtained as solids do not melt sharply by the capillary tube method, and their decomposition temperatures depend upon the rate of heating, becoming lower with slower rates of heating. The melting and decomposition points given in the examples following were obtained in capillary tubes heated at the rate of about 5° C. per minute.

The invention will be further illustrated by reference to the following specific examples:

EXAMPLE I

Gold tert.-amyl mercaptide

To 98.0 grams of practical grade tert.-amyl mercaptan of 85% purity by mercaptan assay (0.80 mole) was added a solution of 112.5 grams of gold liquor containing 35% gold (0.20 mole) in the form of auric chloride in 120 cc. of ethyl acetate, with stirring, during 15 minutes. There was a copious evolution of hydrogen chloride during the addition, and the temperature increased from 24 to 55° C. After stirring for 15 minutes longer, the temperature fell to 34° C., and the mixture was stirred and slowly heated to 89° C. during two and three-quarter hours. Ethyl acetate distilled off during the heating, and the mixture became increasingly viscous. After cooling, the mixture was diluted with 400 cc. of methanol, stirred well at the boiling point, cooled and filtered. The precipitate was 62.1 grams of crude gold tert.-amyl mercaptide as a tan solid. After three crystallizations from toluene, a white solid containing 65.52% gold was obtained that darkened ca. 180° C. and decomposed at 190–5° C.

EXAMPLE II

Gold tert.-octyl mercaptide

The mercaptan used in this example was of the type described in Ind. Eng. Chem. 40, 2308 (1948). To 119.4 grams of practical grade tert.-octyl mercaptan of 98% purity by mercaptan assay (0.80 mole) were added 112.5 grams of gold liquor containing 35% gold (0.20 mole) in the form of auric chloride, with stirring, during 10 minutes. There was a copious evolution of hydrogen chloride during the addition, and the temperature increased from 25 to 52° C. After stirring for 30 minutes, the temperature fell to 30° C. After adding 700 cc. of methanol, the mixture was stirred well, allowed to settle, and the supernatant liquid was decanted from the residual oil. On trituration with two 500 cc. portions of methanol, the oil slowly solidified. When filtered off and dried, the precipitate was 68.3 grams of crude gold tert.-octyl mercaptide as a tan solid. After two crystallizations from toluene, a white solid containing 57.43% gold was obtained that darkened ca. 160° C. and decomposed at 168–73° C.

EXAMPLE III

Gold tert.-dodecyl mercaptide

The tert.-dodecyl mercaptan used in this example was of the type described in Example II comprising a variety of molecular structures and including some tert.-undecyl and tert.-tridecyl mercaptans.

To 250.2 grams of practical grade tert.-dodecyl mercaptan of 87% purity by mercaptan assay (1.2 moles) was added a solution of 157.7 grams gold liquor containing 37.46% gold (0.30 mole) in the form of auric chloride in 100 cc. of water, with stirring at 3 to 6° C. during one-half hour. The mixture was stirred at ca. 5° C. during one and one-half hours and while warming to 30° C. during one-half hour. After adding 200 cc. of water, the mixture was stirred at 50 to 55° C. for 15 minutes and was allowed to settle; the supernatant liquid was siphoned from the residual oil. The oil was washed at 50 to 55° C. with three 300 cc. portions of water, siphoning off the water after each wash. The oil was then washed with methanol at room temperature and with methanol and mixtures of 3 parts of methanol and 1 part of benzene and of 1 part of methanol and 1 part of benzene near the boiling point of the solvent, decanting the solvent after each wash, until the oil became quite viscous. Residual solvent was removed under reduced pressure to 100° C./15 mm., leaving 61.4 grams of viscous orange-yellow oil containing 46.24% gold.

A sample of practical grade tert.-dodecyl mercaptan was fractionated in an efficient still to obtain a cut boiling between 118 and 125° C. at 20 mm. pressure, representing 27% of the starting material. 162 grams of this cut (0.80 mole) was reacted with a solution of 112.5 grams of gold liquor containing 35% gold (0.20 mole) in the form of auric chloride in ethyl acetate, essentially as described in Example I, and the product was washed with water, methanol and a mixture of 3 parts of methanol and 1 part of benzene as described above. After removal of residual solvent, the product was 69.6 grams of viscous dark oil containing 50.31% gold.

EXAMPLE IV

Gold tert.-tetradecyl mercaptide

To 216.9 grams of practical grade tert.-tetradecyl mercaptan of the type described in Example II and of 85% purity by mercaptan assay (0.80 mole) was added a solution of 112.5 grams of gold liquor containing 35% gold (0.20 mole) in the form of auric chloride in 100 cc. of ethyl acetate, with stirring, during 15 minutes. The temperature increased from 22 to 34° C. during the addition. After stirring for 15 minutes, the temperature fell to 24° C. and the mixture was stirred and heated to 80° C. during 5 hours and at 80 to 83° C. for 8 hours. The product was washed repeatedly with warm water and was washed near the boiling point of the solvent with methanol and with mixtures of methanol and acetone containing increasing proportions of acetone up to one part of acetone to one part of methanol until the product became quite viscous. Solvent was removed by decantation after each wash, and, after the last decantation, residual solvent was removed by distillation under reduced pressure to 100° C./20 mm. The residue was 50.3 grams of pale amber, very viscous oil containing 43.79% gold.

EXAMPLE V

Gold tert.-butyl mercaptide

To a solution of 105.2 grams of gold liquor containing 37.46% gold (0.20 mole) in the form of auric chloride in 1 liter of water were added 37.3 grams of methyl sulfide (0.60 mole) during 10 minutes, with stirring and mild cooling, to maintain the temperature between 20 and 25° C. A copious yellow precipitate formed that became pale tan in color as the last of the methyl sulfide was added. After adding 20.2 grams of tert.-butyl mercaptan of 98% purity by mercaptan assay (0.22 mole) during 10 minutes and stirring for one hour longer, a pale tan solid was filtered from the mixture and dried. The solid was stirred with 1.5 liters of boiling toluene, and the mixture was cooled and filtered. The precipitate was 53.9 grams of almost white solid containing 68.96% gold that decomposed without melting between 195 and 205° C.

EXAMPLE VI

Gold tert.-nonyl mercaptide

To a solution of 114.0 grams of gold liquor containing 34.55% gold (0.20 mole) in the form of auric chloride in 1 liter of water were added 37.3 grams of methyl sulfide (0.60 mole) during 10 minutes with stirring and mild cooling to maintain the temperature between 20 and 25° C. After adding 36.4 grams tert.-nonyl mercaptan of the type described in Example II, and of 97% purity by mercaptan assay (0.22 mole) during 10 minutes, stirring was continued for one hour. The voluminous precipitate obtained on adding the methyl sulfide changed to a viscous oil during this period. After adding 30 cc. of chloroform, the mixture was stirred and allowed to settle, and the supernatant liquid was siphoned from the residual oil. The oil was washed at 50 to 60° C. with three 200 cc. portions of water, siphoning off the water after each wash. The oil was then washed with 150 cc. of methanol at room temperature and with three 200 cc. portions of methanol near the boiling point of the solvent, removing the methanol by decantation after each wash, and residual solvent was removed by distillation under reduced pressure to 100° C./10 mm. The product was 71.3 grams of very viscous pale yellow oil containing 54.48% gold.

EXAMPLE VII

Gold tert.-dodecyl mercaptide (a) To a solution of 105.2 grams of gold liquor containing 37.46% gold (0.20 mole) in the form of auric chloride in 1 liter of water were added 37.3 g. methyl sulfide (0.60 mole) with stirring at 3 to 6° C. during 1 hour. A copious yellow precipitate formed that became pale tan in color as the last of the methyl sulfide was added. 44.3 grams of practical grade tert.-dodecyl mercaptan of the type described in Example III, and of 96% purity by mercaptan assay (0.21 mole) were added with stirring at 3 to 6° C. during 15 minutes and were rinsed in with 30 cc. of chloroform. During the addition, the voluminous precipitate became a viscous oil. The mixture was stirred and slowly warmed to 16° C. during one and one-half hours and to 50° C. during one-half hour and was allowed to settle. The supernatant aqueous layer was siphoned from the residual oil, and the oil was washed at 50 to 60° C. with three 300 cc. portions of water, siphoning off the aqueous layer after each wash. The oil was then washed at room temperature with 150 cc. of methanol and near the boiling point of the solvent with three 200 cc. portions of methanol, decanting the solvent after each wash, and residual solvent was removed by distillation under reduced pressure to 100° C./12 mm. The product was 80.4 grams of very viscous pale amber oil containing 48.77% gold.

(b) The above experiment was repeated using an equivalent quantity of tert.-dodecyl mercaptan of 93% purity by mercaptan assay, prepared by the low temperature catalytic addition of hydrogen sulfide to triisobutylene and consisting principally of 2-neopentyl-4,4-dimethyl-2-pentanethiol and 1,1,3,3,5,5-hexamethylhexanethiol in the ratio of about 9 parts of the former to 1 part of the latter. The product began to solidify during the first methanol wash. Without further washing, it was dissolved in 50 cc. of chloroform and poured with good stirring into 1.2 liters of methanol. An oil separated that rapidly solidified. The solid, filtered off and dried, was 79.7 grams of pale yellow powder that melted very indefinitely between 70 and 105° C., began to decompose at about 115° C. and contained 48.21% gold. Solvents in which this material is soluble to the extent of at least 50% by weight, giving clear fluid solutions, include methyl ethyl ketone, cyclohexanone, ethyl acetate, butyl acetate, iso-octyl thioglycolate, ethyl ether, butanol, benzene, nitrobenzene, toluene, xylene, petroleum ether, chloroform, carbon tetrachloride, dipentene, dipentene oxide, pinene, turpentine, and a wide range of essential oils.

(c) To a solution of 52.6 grams of gold liquor containing 37.46% gold (0.10 mole) in the form of auric chloride were added 43.9 grams of n-butyl sulfide with stirring during 10 minutes. The temperature increased from 21 to 26° C. during the addition, and a dark red oil separated that turned yellow in color as the last of the sulfide was added. After stirring 10 minutes longer, 23.9 grams of the tert.-dodecyl mercaptan described in (b) above (0.11 mole) were added with stirring during 5 minutes and were rinsed in with 6 cc. of chloroform. The mixture was stirred for an hour longer and allowed to settle, and the supernatant aqueous layer was removed by siphoning. The residual oil was washed with three 200 cc. portions of water, siphoning off the aqueous layer after each wash. The oil was rinsed into a separatory funnel with 15 cc. of chloroform, separated from remaining water and slowly added with stirring to 800 cc. of methanol. An oily solid separated. Methanol was decanted from the solid, which was dissolved in 100 cc. of ethyl acetate and slowly added with stirring to one liter of methanol. The mixture was filtered, and the solid precipitate was washed on the filter with methanol and air-dried, giving 40.4 grams of tan solid containing 49.45% gold.

(d) To a solution of 57.0 grams of gold liquor containing 34.55% gold (0.10 mole) in the form of auric chloride in 500 cc. of methanol were added 18.6 grams of methyl sulfide (0.30 mole) with stirring at 20 to 25° C. during 7 minutes. After stirring for 10 minutes, 23.9 grams of the tert.-dodecyl mercaptan described in (b) above (0.11 mole) were added during 10 minutes, and the mixture was stirred for 2 hours longer and filtered from a somewhat oily solid. The solid was dissolved in 100 cc. of ethyl acetate and slowly added with good stirring to one liter of methanol. The solid precipitate, removed by filtration, washed on the filter with methanol and air-dried, was 38.2 grams of yellow solid containing 49.54% gold.

(e) To a mixture of 12.4 grams of methyl sulfide (0.20 mole), 23.9 grams of the tert.-dodecyl mercaptan described in (b) above (0.11 mole), 30 cc. of chloroform and 50 cc. of water was added a solution of 57.0 grams of gold liquor containing 34.55% gold (0.10 mole) in the form of auric chloride in 100 cc. water, with stirring, at ca. 20° C. during 45 minutes. The mixture was stirred for an hour longer and allowed to settle, and the supernatant aqueous layer was removed by siphoning. The residual chloroform solution was washed with three 200 cc. portions of water, siphoning off the aqueous layer after each wash. The chloroform solution was rinsed into a separatory funnel with 20 cc. of chloroform, separated from remaining water and added with good stirring during one hour to 800 cc. of methanol. The mixture was filtered, and the solid precipitate was washed on the filter with methanol and air dried, giving 41.8 grams of white solid containing 46.55% gold.

A similar product is obtained when an aqueous solution of an equivalent amount of potassium chloraurate is substituted for the gold liquor.

EXAMPLE VIII

Gold tert.-hexadecyl mercaptide

Gold tert.-hexadecyl mercaptide, prepared essentially as described in Example VI from tert.-hexadecyl mercaptan of the type described in Example II, was obtained as a viscous yellow oil containing 39.84% gold.

EXAMPLE IX

Gold decoration at low temperatures

A solution of 5.18 grams of the gold tert.-dodecyl mercaptide described in Example VIIb in 9.91 grams of ethyl acetate plus 9.91 grams of butyl acetate was prepared. The clear yellow solution, which contained 10% gold, was applied by brushing to a variety of materials. After most of the solvent evaporated, the materials were heated in an oven at about 160° C. for one hour and the film of metallic gold so produced was examined. Materials on which a bright conductive gold film was obtained, without substantial decomposition of the material by the heat applied, include the quill of a feather, a mother-of-pearl button, a sea-shell (*Oliva sayana*), thin aluminum foil, very thin aluminum foil on a paper backing, pewter, a melamine-formaldehyde plastic (Melamine dinnerware), fiberglass impregnated with a melamine-formaldehyde resin, a cellulose triacetate plastic film, a phenolic resin paper laminate, a continuous filament glass fabric bonded with silicone resin known as Formica G-7-2, and a sheet of water soluble gum coated paper of the type used for preparing decalcomanias. Materials on which a bright non-conductive gold film was obtained without substantial decomposition of the material by the heat applied include a polyethylene terephthalate plastic known as Mylar, both as a free film and as a film on a paper backing, and a polyamide plastic known as nylon. Adherence of the gold film varies from poor on pewter to excellent on Mylar or nylon. The less adherent films may be stabilized to abrasion by the application of a clear lacquer or varnish, or, in the case of the plastics, by laminating a thin film of the plastic over the gold film.

EXAMPLE X

Liquid bright gold decorating compositions

As an example of the use of a gold tertiary alkyl mercaptide in a liquid bright gold decorating composition containing conventional diluents and fluxes, a mixture of the following ingredients was prepared.

| Ingredient | Parts by weight |
| --- | --- |
| Gold tert.-dodecyl mercaptide as described in Example VIIb dissolved in cyclohexanone (35% Au) | 286 |
| Rhodium resinate dissolved in a mixture of essential oils and hydrocarbons (1% Rh) | 50 |
| Bismuth resinate dissolved in a mixture of essential oils (4.5% Bi) | 70 |
| Chromium resinate dissolved in a mixture of cyclohexanone and oil of turpentine (2.05% Cr) | 20 |
| Asphalt dissolved in oil of turpentine (30% asphalt) | 200 |
| Rosin dissolved in oil of turpentine (50% rosin) | 200 |
| Chloroform | 100 |
| Nitrobenzene | 70 |
| Oil soluble red dye | 4 |
| Total | 1,000 |

The clear dark red solution thus obtained contained 10% gold, 0.05% rhodium, 0.32% bismuth, 0.04% chromium, 6% asphalt and 10% rosin. It was applied by brushing to various articles, which were heated in a kiln to a specified firing temperature and held at this temperature for 10 to 20 minutes and then slowly cooled.

In every case a beautiful, clear, golden yellow, adherent film was obtained. The properties of the film vary somewhat with the nature of the underlying surface and are summarized below.

| Article | Firing temperature, °C. | Appearance of film |
| --- | --- | --- |
| A fiberglass laminated plastic | 250 | bright. |
| Quartz crystal, rough cut surface | 450 | matte. |
| Pressed composition mica, unpolished surface | 450 | Do. |
| Aluminum alloy AL-52-S panel, polished surface | 450 | Do. |
| Aluminum AL-2-S panel, polished surface | 450 | bright. |
| Stainless steel type 302, unpolished surface | 600 | semi-bright. |
| Stainless steel type 430, unpolished surface | 600 | Do. |
| Titanium metal panel, unpolished surface | 600 | matte. |
| White porcelain enamel on steel | 600 | bright. |
| Soda lime clear glass tumbler | 600 | Do. |
| Soda lime clear glass bottle | 600 | Do. |
| Tempered soda lime opal glass dish | 650 | Do. |
| Borosilicate opal glass dish | 650 | Do. |
| Borosilicate clear glass tubing | 650 | Do. |
| A glass composition known as Pyroceram | 740 | Do. |
| Glazed earthenware dish | 740 | Do. |
| Hard porcelain dish | 740 | Do. |

All films are excellent conductors of electricity except the film on fiberglass laminated plastic, which is moderately conductive.

As an example of a liquid bright gold decorating composition containing a lacquer, a mixture of the following ingredients was prepared.

| Ingredient | Parts by weight |
| --- | --- |
| Gold tert.-dodecyl mercaptide as described in Example VIIb dissolved in Lacasol (35% Au) | 286 |
| Rhodium resinate dissolved in a mixture of essential oils and hydrocarbons (2.5% Rh) | 20 |
| Bismuth resinate dissolved in a mixture of essential oils (4.5% Bi) | 70 |
| Chromium resinate dissolved in a mixture of cyclohexanone and oil of turpentine (2.05% Cr) | 20 |
| Rosin dissolved in oil of turpentine (50% rosin) | 300 |
| Nitrocellulose dissolved in a mixture of dibutyl phthalate and benzyl benzoate (2% nitrocellulose) | 300 |
| Oil soluble red dye | 4 |
| Total | 1,000 |

Lacasol is a petroleum aliphatic hydrocarbon solvent boiling between 202 and 240° F. containing 10% aromatics, and is supplied by Modern Mineral Solvents Corp., Perth Amboy, N.J.

The clear dark red solution thus obtained contained 10% gold, 0.05% rhodium, 0.32% bismuth, 0.04% chromium, 15% rosin and 0.6% nitrocellulose. It was applied by brushing to the materials described above and fired in the same manner, giving substantially identical results.

EXAMPLE XI

Gold luster decorating composition

As an example of the use of a gold tertiary alkyl mercaptide in a gold luster decorating composition, a mixture of the following ingredients was prepared.

| Ingredient | Parts by weight |
| --- | --- |
| Gold tert.-dodecyl mercaptide as described in Example VIIb dissolved in cyclohexanone (35% Au) | 57 |
| Bismuth resinate dissolved in a mixture of essential oils and hydrocarbons (4.5% Bi) | 400 |
| Rosin dissolved in oil of turpentine (50% rosin) | 1,340 |
| Chloroform | 200 |
| Oil soluble red dye | 3 |
| Total | 2,000 |

The clear dark red solution thus obtained contained 1% gold, 0.9% bismuth and 33.5% rosin. It was applied by brushing to a soda lime clear glass tumbler, which was heated to about 600° C., held at this temperature for 10 minutes and slowly cooled. An adherent, bright non-conductive film was obtained that is blue when viewed by transmitted light and has a beautiful coppery, violet metallic sheen or luster when viewed by reflected light.

EXAMPLE XII

*Burnish gold decorating compositions*

As an example of a paste burnish gold decorating composition, the following ingredients were thoroughly mixed and ground in a steel roller mill to give a thick paste, in which the solid components are in a finely divided state.

| Ingredient | Parts by weight |
|---|---|
| Gold tert.-dodecyl mercaptide as described in Example VII*b* dissolved in cyclohexanone (35% Au) | 35 |
| Gold tert.-butyl mercaptide as described in Example V (69% Au) | 100 |
| Bismuth subnitrate (72% Bi) | 10 |
| Butyl oxalate | 65 |
| Total | 210 |

The resulting paste, which contained 38.8% gold and 3.4% bismuth, was thinned to brushing consistency with a 50% solution of rosin in oil of turpentine and was applied by brushing to a soda lime clear glass tumbler, which was heated to about 600° C., held at this temperature for 10 minutes and slowly cooled. An adherent conductive film of metallic gold was obtained that had a somewhat dull appearance. When burnished lightly with a glass fiber burnisher, the film had the soft golden luster characteristic of burnished gold.

It will be obvious to those skilled in the art that many modifications may be made within the scope of the present invention without departing from the spirit thereof, and the invention includes all such modifications.

What is claimed is:
1. A gold tertiary alkyl mercaptide.
2. A compound having the formula

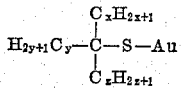

in which *x*, *y*, and *z* are integers from 1 to about 40.
3. A gold tert.-octyl mercaptide.
4. A gold tert.-dodecyl mercaptide.
5. A gold tert.-tetradecyl mercaptide.
6. A gold tert.-nonyl mercaptide.
7. A gold tert.-hexadecyl mercaptide.
8. A gold decorating composition comprising a gold tertiary alkyl mercaptide and a diluent therefor.
9. A gold decorating composition comprising a compound having the formula

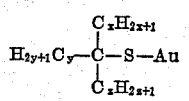

in which *x*, *y*, and *z* are integers from 1 to about 40, and a diluent therefor.
10. A gold decorating composition comprising a gold tert.-octyl mercaptide and a diluent therefor.
11. A gold decorating composition comprising a gold tert.-dodecyl mercaptide and a diluent therefor.
12. A gold decorating composition comprising a gold tert.-tetradecyl mercaptide and a diluent therefor.
13. A gold decorating composition comprising a gold tert.-nonyl mercaptide and a diluent therefor.
14. A gold decorating composition comprising a gold tert.-hexadecyl mercaptide and a diluent therefor.
15. A gold decorating composition comprising a gold tertiary alkyl mercaptide, a diluent, and a gold flux.
16. A gold decorating composition comprising a compound having the formula

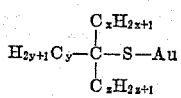

in which *x*, *y*, and *z* are integers from 1 to about 40, a diluent, and a gold flux.
17. A gold decorating composition comprising a gold tert.-octyl mercaptide, a diluent, and a gold flux.
18. A gold decorating composition comprising a gold tert.-dodecyl mercaptide, a diluent, and a gold flux.
19. A gold decorating composition comprising a gold tert.-tetradecyl mercaptide, a diluent, and a gold flux.
20. A gold decorating composition comprising a gold tert.-nonyl mercaptide, a diluent, and a gold flux.
21. A gold decorating composition comprising a gold tert.-hexadecyl mercaptide, a diluent, and a gold flux.
22. A method of making a gold tertiary alkyl mercaptide which comprises reacting an alkyl sulfide-aurous halide complex with a tertiary alkyl mercaptan.
23. A method of making a gold tert.-tetradecyl mercaptide which comprises reacting auric chloride with methyl sulfide to form a complex and reacting the complex with tert.-tetradecyl mercaptan.
24. A method of making a gold tert.-nonyl mercaptide which comprises reacting auric chloride with methyl sulfide to form a complex, and reacting the complex with a tert.-nonyl mercaptan.
25. A method of making a gold tert.-dodecyl mercaptide which comprises reacting auric chloride with methyl sulfide to form a complex, and reacting the complex with a tert.-dodecyl mercaptan.
26. A method of making a gold tert.-hexadecyl mercaptide which comprises reacting auric chloride with methyl sulfide to form a complex, and reacting the complex with a tert.-hexadecyl mercaptan.
27. A method of making a gold tert.-octyl mercaptide which comprises reacting auric chloride with methyl sulfide to form a complex, and reacting the complex with a tert.-octyl mercaptan.
28. Gold tert.-amyl mercaptide.
29. Gold tert.-butyl mercaptide.
30. A gold decorating composition comprising gold tert.-amyl mercaptide and a diluent therefor.
31. A gold decorating composition comprising gold tert.-butyl mercaptide and a diluent therefor.
32. A gold decorating composition comprising gold tert.-amyl mercaptide, a diluent, and a gold flux.
33. A gold decorating composition comprising gold tert.-butyl mercaptide, a diluent, and a gold flux.
34. A method of making gold tert.-amyl mercaptide which comprises reacting auric chloride with methyl sulfide to form a complex, and reacting the complex with tert.-amyl mercaptan.
35. A method of making gold tert.-butyl mercaptide which comprises reacting auric chloride with methyl sulfide to form a complex, and reacting the complex with tert.-butyl mercaptan.

References Cited in the file of this patent

UNITED STATES PATENTS

| 2,370,592 | Trenner et al. | Feb. 27, 1945 |
| 2,490,399 | Ballard | Dec. 6, 1949 |
| 2,842,457 | Morgan et al. | July 8, 1958 |

FOREIGN PATENTS

| 465,291 | Great Britain | May 5, 1937 |